United States Patent [19]

Heinold

[11] Patent Number: 4,927,054
[45] Date of Patent: May 22, 1990

[54] APPARATUS FOR SINGULARIZING GARMENT HANGERS

[75] Inventor: Hans Heinold, Dietzenbach, Fed. Rep. of Germany

[73] Assignee: Sussman, Jennewein Bekleidungstechnik GmbH, Mörfelden-Walldorf, Fed. Rep. of Germany

[21] Appl. No.: 301,511

[22] Filed: Jan. 24, 1989

[30] Foreign Application Priority Data

Jan. 30, 1988 [DE] Fed. Rep. of Germany ....... 3802805

[51] Int. Cl.$^5$ ............................................. B65G 59/00
[52] U.S. Cl. .................................. 221/289; 198/463.5; 221/312 A
[58] Field of Search ................. 198/463.5, 465.4; 221/192, 194, 195, 239, 270, 289, 294, 312 A

[56] References Cited

U.S. PATENT DOCUMENTS

| | | | |
|---|---|---|---|
| 3,799,318 | 3/1974 | Dekoekkoek | 198/463.5 |
| 3,799,395 | 3/1974 | Vanderpool | 221/289 |
| 3,961,699 | 6/1976 | Hirsch | 198/463.5 |
| 4,276,995 | 7/1981 | Jennewein | 221/312 A |

FOREIGN PATENT DOCUMENTS 71856 2/1983 European Pat. Off. ......... 198/463.5

Primary Examiner—Joseph E. Valenza
Attorney, Agent, or Firm—Peter K. Kontler

[57] ABSTRACT

Apparatus for singularizing garment hangers in a plant wherein the hooks of garment hangers are slidable along a downwardly sloping ramp has a stop with a tooth extending upwardly from an intermediate portion of the ramp. The tooth has a substantially vertical arresting flank confronting the oncoming hooks, and a downwardly sloping second flank defining with the arresting flank an apex at a level above the topmost portion of the hook which is arrested by the tooth. An elevator, which is movable up and down by a fluid-operated motor, has a leg which is reciprocable adjacent the stop upstream of the arresting flank to lift the foremost arrested hook to a level above the apex so that the lifted hook can ride over the tooth and descends onto the ramp below the stop. The leg of the elevator has a top land which slopes downwardly and is flush with the second flank of the tooth in the upper position of the elevator to facilitate downward movement of the lifted hook. The effective width of the top land is between 0.5 and 1.5 D wherein D is the diameter of the wire of which the hooks are made.

18 Claims, 2 Drawing Sheets

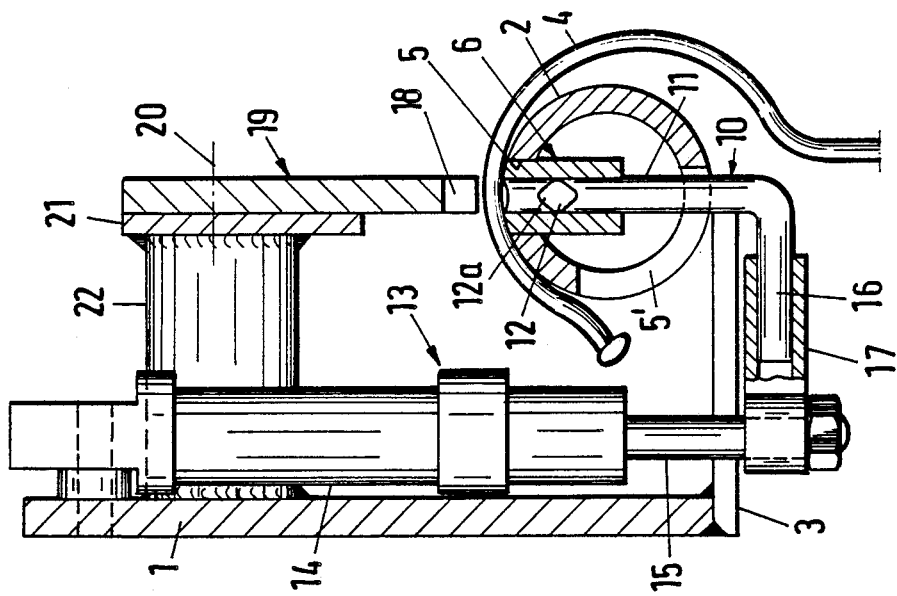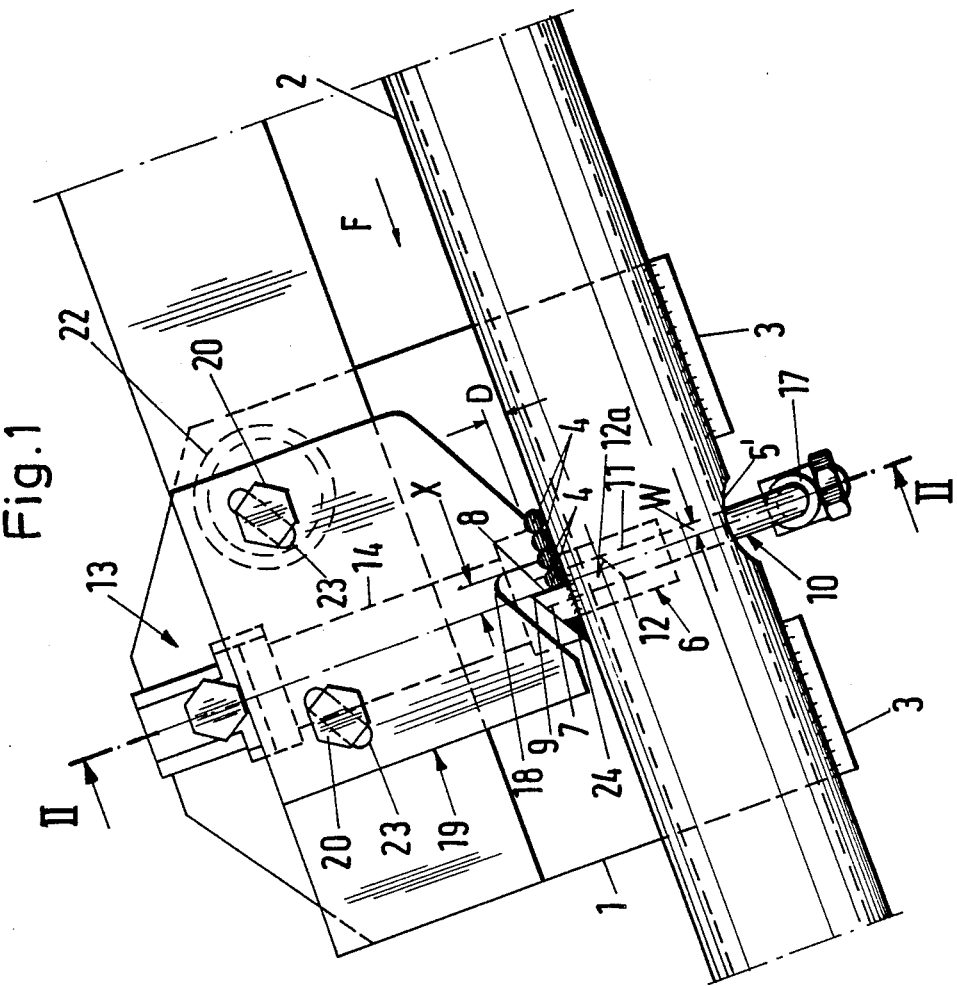

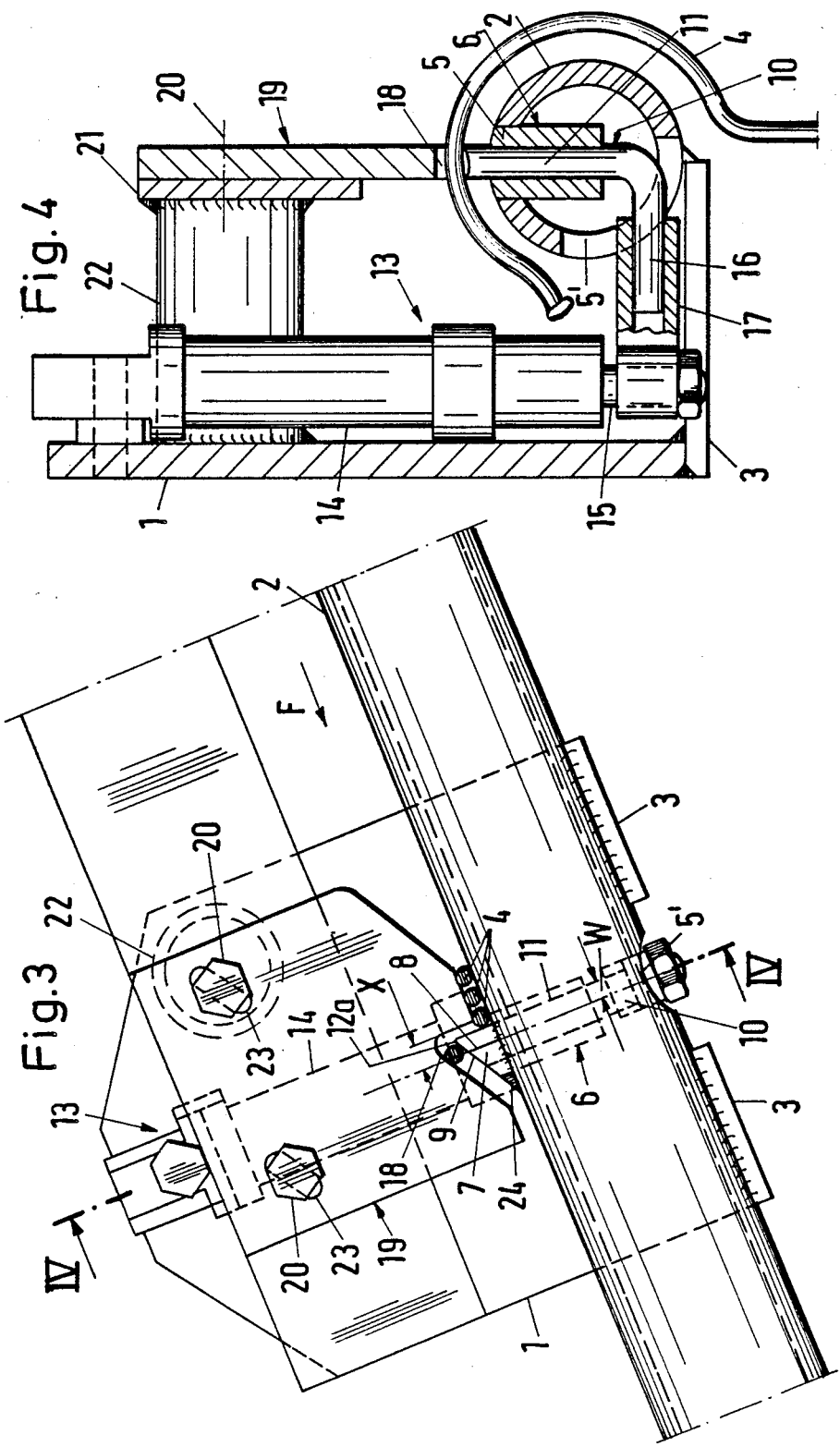

APPARATUS FOR SINGULARIZING GARMENT HANGERS

BACKGROUND OF THE INVENTION

The invention relates to apparatus for manipulating garment hangers and like objects, and more particularly to improvements in apparatus for singularizing suspendible portions (such as hooks) of garment hangers. Still more particularly, the invention relates to improvements in apparatus for singularizing suspendible portions (hereinafter called hooks) of objects (hereinafter called garment hangers or hangers) which are supported by an inclined ramp and tend to slide along the ramp under the action of gravity.

It is often necessary to singularize hangers which are transported in a processing machine (e.g., in a garment manufacturing plant or in a cleaning establishment) so that a processing station receives one hanger or one garment-carrying hanger at a time. U.S. Pat. No. 4,276,995 to Jennewein discloses a singularizing apparatus wherein the hooks of garment hangers straddle a downwardly sloping rail and can be singularized by a mobile stop in the rail in conjunction with an mobile intercepting member above the rail. The stop is biased upwardly into the path of movement of oncoming hooks by a first spring, and the intercepting member is biased upwardly and away from operative position by a second spring. A cylinder and piston unit is used to move the intercepting member downwardly when a hanger is to advance beyond the stop whereby the stop is depressed and the foremost hook rides over the depressed stop to be arrested by the intercepting member before the stop is permitted to rise again in order to arrest the next hook. The intercepting member is then lifted by the second spring to release the intercepted foremost hook. The first spring which biases the stop upwardly must be sufficiently strong to enable the rising stop to move the entire series of hooks on the rail upwardly and away from the intercepting member when the stop is permitted to rise in response to lifting of the intercepting member by the second spring. Thus, the force of the first spring must be selected in dependency upon the inclination of the rail, on the combined weight of hangers and garments thereon, and on the total number of hangers on the rail upstream of the stop. If the singularizing apparatus is to be effective for satisfactory singularization of a relatively long series of heavy hangers, the apparatus must employ a rather strong spring for the stop and a strong cylinder and piston unit which is capable of depressing the stop into the rail against the opposition of the first spring. If the apparatus is used for singularization of lightweight hangers, the bias of the first spring is excessive and the energy requirements of the cylinder and piston unit are also excessive. Moreover, the apparatus is out of commission if the first spring breaks or jams, and the frequency of the singularizing operation is dependent on the weight of hangers and of the garments thereon.

OBJECTS OF THE INVENTION

An object of the invention is to provide a novel and improved apparatus which can singularize garment hangers and other objects having hooks or otherwise configurated suspendible portions at a frequency which greatly exceeds the frequency of singularizing action of heretofore known apparatus.

Another object of the invention is to provide a singularizing apparatus which can singularize garment hangers and like objects at a frequency which is not dependent upon the mass or weight of the objects and/or of the garments thereon.

A further object of the invention is to provide a singularizing apparatus which can be used in existing plants as a superior substitute for heretofore known apparatus.

An additional object of the invention is to provide the apparatus with novel and improved means for piling up, arresting and individually releasing successive suspendible portions of garment hangers and like objects in a garment manufacturing and/or treating plant.

Still another object of the invention is to provide the apparatus with novel and improved means for individually releasing successive suspendible portions of garment hangers or the like for movement along a downwardly sloping conveyor under the action of gravity.

A further object of the invention is to provide a novel and improved method of rapidly and reliably singularizing garment hangers in garment manufacturing, cleaning and/or other plants.

SUMMARY OF THE INVENTION

The invention is embodied in an apparatus for singularizing objects (particularly garment hangers) having substantially hook-shaped suspendible portions (hereinafter hooks). The improved apparatus comprises a ramp which includes an upper portion and a lower portion and serves to support a series of hooks. The inclination of the ramp is such that the hooks thereon slide by gravity in a direction from the upper to the lower portion of the ramp. The apparatus further comprises an intercepting member which is disposed intermediate the upper and lower portions of the ramp and has a section (e.g., a tooth-shaped section) located in the path of movement of oncoming hooks on the ramp so that the foremost oncoming hook comes to rest in response to engagement with the intercepting member, and means for lifting successive hooks of the series of hooks above the intercepting member. The lifting means comprises an elevator which is adjacent to and is located ahead of the aforementioned section of the intercepting member (as considered in the direction of advancement of hooks along the ramp), and means for moving the elevator between a lower position beneath the hook which abuts the section of the intercepting member and an upper position in which the elevator lifts the hook thereabove to a level such that the thus lifted hook can ride over and beyond the section of the intercepting member in the aforementioned direction.

The preferably tooth-shaped section of the intercepting member is preferably provided with an arresting flank which faces counter and extends substantially at right angles to the aforementioned direction. The elevator is arranged to lift the hook thereon above the arresting flank in response to movement of the elevator to the upper position.

The elevator preferably includes a top land which slopes downwardly in the aforementioned direction and carries the hook thereabove during movement to the upper position so that the hook which has been lifted by the top land can slide along and beyond the top land and beyond the section of the intercepting member in the upper position of the elevator. The tooth-shaped section of the intercepting member preferably further comprises a second flank which defines with the arresting flank an apex located beneath the top land of the elevator when the elevator is moved to the upper position so that the hook on the top land can ride over the apex and along the second flank in response to movement of the elevator to the upper position.

As a rule, the material of which the hooks are made will have a circular cross-sectional outline, e.g., the hooks can be made of metallic wire. The effective width of the top land of the elevator is preferably between about 0.5 and 1.5 D, wherein D is the diameter of the material (wire) of a hook.

The apparatus can further comprise a guide or hold-down device which is disposed above and defines with the section of the intercepting member a channel for the hooks of successive hangers. The inlet of the channel is adjacent the top land of the elevator in the upper position of the elevator (in fact, the top land can extend into such inlet) in the upper position of the elevator, and the effective width of the inlet in the direction of advancement of hooks along the ramp is preferably between 1 D and 2 D. A portion of the channel can be defined by a recess in the underside of the guide, and the elevator can extend into such recess when it reaches the upper position.

The intercepting member can include a second section which is confined in (e.g., which can be welded to) the ramp. At least the second section of the intercepting member can constitute a tube. The ramp can also include or constitute a tube or pipe having a cylindrical external surface.

The top land of the elevator can be substantially flush with the second flank of the intercepting member in the upper position of the elevator.

In accordance with a presently preferred embodiment of the improved singularizing apparatus, the elevator includes a substantially vertical leg which is reciprocably installed in a tubular ramp adjacent the intercepting member, and a second leg which is disposed beneath the ramp and is rigid with the substantially vertical leg. The moving means can include a fluid-operated (hydraulic or pneumatic) motor having an output element (e.g., a piston rod) connected to the second leg of the elevator. The motor is preferably located at one side of and is spaced apart from the ramp. The cylinder of the motor can be stationary, and the piston of the motor can include or carry the aforementioned output element which transmits motion to the second leg of the elevator.

The radius of curvature of each hook is preferably selected in such a way that the radius of the external surface of the ramp is between approximately 0.6 and 0.9 R (most preferably between about 0.65 and 0.7 R), wherein R is the radius of curvature of a hook.

The ramp, the intercepting member and the lifting means can be supported by a plate-like member. The aforementioned guide or hold-down device can be adjustably mounted on the support for the ramp in such a way that an operator can alter the dimensions of the aforementioned channel in order to even further reduce the likelihood of simultaneous transfer of two or more hooks and/or to prevent jamming of hooks in the channel.

As mentioned above, the intercepting member (or at least the second section of the intercepting member) can constitute a tube. It is then possible to mount the substantially vertical leg of the elevator directly in the intercepting member. At least the substantially vertical leg of the elevator can have a substantially circular cross-sectional outline.

If the ramp is or includes a tube or pipe, it can be provided with two openings, one for the substantially vertical leg and the other for the second leg of the elevator. The substantially vertical leg extends from the ramp through the one opening in the upper position of the elevator, and the second leg extends from the ramp through the other opening in each position of the elevator.

The novel features which are considered as characteristic of the invention are set forth in particular in the appended claims. The improved singularizing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary elevational view of an apparatus which embodies the invention, a set of four hooks of garment hangers being shown in a sectional view and the elevator of the means for lifting successive hooks over the intercepting member being shown in the lower position;

FIG. 2 is a sectional view substantially as seen in the direction of arrows from the line II—II of FIG. 1;

FIG. 3 is a view corresponding to that of FIG. 1 but showing the elevator in the upper position with the foremost hook in the process of riding over the intercepting member; and FIG. 4 is a sectional view substantially as seen in the direction of arrows from the line IV—IV of FIG. 3.

DESCRIPTION OF PREFERRED EMBODIMENTS

The apparatus which is shown in FIGS. 1 to 4 comprises a plate-like support 1 which can constitute an element of the frame of a garment treating machine, e.g., a machine of the type disclosed in the aforementioned U.S. Pat. No. 4,276,995 to Jennewein. The support 1 is provided with brackets 3 for a ramp 2 in the form of an elongated tube having a cylindrical external surface and sloping downwardly in a direction to the left, as seen in FIGS. 1 and 3. The ramp 2 constitutes a conveyor for a series of arcuate hooks 4 forming part of garment hangers and being arranged to slide by gravity in the direction of arrow F, namely from an upper portion toward a lower portion of the ramp. The ramp 2 is welded to the brackets 3 of the support 1. The hangers which include the hooks 4 can be of conventional design, and each such hanger can support a garment (e.g., a freshly cleaned garment) while its hook 4 straddles the ramp 2 and slides or tends to slide downwardly (arrow F) so that the foremost hook comes to rest in response to engagement with a first (arresting) flank 8 of a tooth-shaped upper section or head 7 of an intercepting member 6 which has a sleeve-like lower section confined in the interior of the tubular ramp 2. The ramp 2 has a radially extending opening 5 through which the intercepting member 6 (hereinafter called stop) extends so that the section 7 projects upwardly beyond the ramp at the twelve o'clock position (as seen in FIGS. 2 and 4). The stop 6 is a relatively short tube which can be a press fit in the opening 5 so that it can be adjusted in the radial direction of the ramp, or which can be welded or otherwise fixedly secured to the ramp in the path of downward movement of the bights of arcuate hooks 4.

The section 7 of the stop 6 resembles a tooth having a substantially semicircular cross-sectional outline, and its flank 8 is located in a plane which includes or is close to the axis of the stop 6. The section 7 further includes a second flank 9 which slopes downwardly from the topmost portion of the flank 8 in the direction of arrow F and toward the lower portion of the ramp 2 (to the left of the opening 5 in the ramp). The flank 8 faces counter to the direction of arrow F and extends substantially at right angles to such direction so that it can reliably intercept and arrest the foremost oncoming hook 4 of a series of successive hooks or a single oncoming hook. FIG. 1 shows that the section 7 of the stop 6 is engaged by the foremost hook 4 of a set of four closely adjacent hooks which straddle the ramp 2 ahead of the intercepting or singularizing station. The distance of the apex of the tooth-shaped section 7 (i.e., of the ridge which is defined by the flanks 8 and 9 of this section) from the uppermost portion of the adjacent part of external surface of the ramp 2 is not less than 0.5 D, wherein D is the diameter of a hook 4 (i.e., the diameter of the wire of which the hook 4 is made.

The tubular stop 6 further serves as a guide for the substantially vertical leg 11 of an L-shaped elevator 10 which constitutes one component of a means for individually lifting successive hooks 4 to a level above the apex of the tooth-shaped section 7 so that the hooks 4 can ride over the stop 6 on their way back onto the ramp 2 downstream or below the opening 5. The lower end portion of the reciprocable leg 11 is integral with a second leg 16 which is located beneath the ramp 2 and extends into a tubular socket 17 at the lower end of a piston rod 15 connected to a piston (not shown) in the cylinder 14 of a fluid-operated (e.g., pneumatic) motor 13 which is affixed to the support 1 at one side of the ramp 2. The combined effective length of the leg 16 and socket 17 suffices to ensure that the cylinder 14 of the motor 13 cannot interfere with movements of successive hooks 4 toward, over and beyond the stop 6.

The upper end portion of the leg 11 of the elevator 10 has a top land or flank 12 which is flush or substantially flush with the flank 9 of the section 7 when the elevator 10 is moved to the upper position of FIGS. 3 and 4. When the motor 13 maintains the elevator 10 in the lower position of FIGS. 1 and 2, the top land 12 is located beneath and adjacent the foremost hook 4, i.e., it is disposed beneath the bight of that hook 4 which abuts the flank 8 of the section 7. When the motor 13 is actuated (e.g., in response to a signal from a sensor, not shown, which is located at the garment treating station downstream of the stop 6 and generates a signal when a fresh hanger with a garment thereon is to be caused to move over the section 7 and to thereupon slide downwardly along the lower part of the ramp 2), the top land 12 of the leg 11 rises above the uppermost portion of the adjacent part of the ramp 2 and the topmost portion or apex 12a of the leg 11 is then located at a level above the apex of the section 7 so that the hook 4 which has been lifted by the leg 11 can slide along the top land 12, thereupon along the flank 9 and over a welded seam 24 to return onto the ramp 2 and to slide therealong toward the next processing station. The welded seam 24 is located immediately downstream of the lowermost portion of the flank 9 and serves to fix the stop 6 with reference to the ramp 2 in the illustrated position. The upper side of the welded seam 24 is preferably finished so that it is flush with the flank 9 of the section 7.

FIGS. 2 and 4 show that a properly suspended hook 4 straddles the ramp 2 in such a way that its free end is disposed between the cylinder 14 of the motor 13 and the ramp 2. The free end of such hook is disposed at a level above the brackets 3 for the ramp 2 so that the section 7 of the stop 6 constitutes the only obstruction in the path of movement of hooks 4 along the ramp 2. The latter has a second opening 5' for the leg 11 of the elevator 10.

The effective width W of the top land 12 (as measured in the direction of arrow F) can be less than D but is preferably less than 2D. It is presently preferred so select the dimensions of the top land 12 in such a way that the effective width W is between 0.5 and 1.5 D. This ensures that the leg 11 lifts one hook 4 at a time when the motor 13 is actuated to move the elevator 10 from the lower position of FIGS. 1–2 to the upper position of FIGS. 3–4.

The support 1 further carries a hold-down device or guide 19 which defines with the section 7 of the stop 6 an arcuate channel 18 for successive hooks 4, i.e., for those hooks which are caused to ride over the apex of the section 7 on their way toward the ramp 2 at a level below the opening 5. The channel 18 has an inlet above the top land 12 of the leg 11, and this inlet receives the apex 12a of the leg 11 in the upper position of the elevator 10. This ensures that the hook 4, which has been lifted by the leg 11, is compelled to enter the channel 18 and to advance over the section 7 toward and along the flank 9 and welded seam 24. The width X of the inlet of the channel 18 (as measured in the direction of the arrow F) is preferably between about 1 D and 2 D. The underside of the guide 19 has a recess which forms part of the channel 18. This guide is a plate-like element which is adjustably secured to discs 21 at the free ends of tubular projections 22 of the support 1 by screws, bolts or other suitable fasteners 20. The guide 19 has elongated closed slots 23 for the shanks of the fasteners 20. The inclination of the slots 23 preferably equals or approximates the inclination of the flank 9 on the section 7 of the stop 6. This enables the operator to increase or reduce the width and/or height of the channel 18, depending upon the diameters D of the hooks 4 on the ramp 2. The dimensions of the channel 18 can be adjusted in and at right angles to the direction which is indicated by the arrow F.

The diameter of the cylindrical external surface of the ramp 2 is preferably between about 0.6 and 0.9 R (most preferably between about 0.65 and 0.7 R), wherein R is the radius of curvature of a hook 4. In the illustrated embodiment, the diameter of the external surface of the ramp 2 is approximately 0.67 R. It has been found that such ratio of R to the outer diameter of the ramp 2 enables the hooks 4 to readily slide along the ramp but prevents excessive turning of the hooks about a vertical axis, i.e., a swaying of the hooks back and forth to the left and to the right, as seen in FIG. 2 or 4.

An important advantage of the improved apparatus is that it is not necessary to employ a spring in order to lift the elevator 10 and a hook 4 thereon for the purpose of enabling the hook to ride over and beyond the section 7 of the stop 6. Thus, the motor 13 can constitute a double-acting cylinder and piston unit which is capable of lifting and lowering the leg 11 of the elevator 10 at a desired frequency. Of course, it is also possible to employ a motor which pneumatically or hydraulically lifts the elevator 10 and employs a resilient element for moving the leg 11 to the lower position of FIGS. 1–2 or vice versa. The frequency at which the motor 13 can move the elevator 10 between the upper and lower positions is not dependent upon the mass and/or weight of the hooks 4 and/or of the respective hangers and/or of the garments on such hangers. The force which is required to move the elevator 10 from the position of FIGS. 3–4 back to the position of FIGS. 1–2 is very small.

The guide 19 constitutes an optional but desirable feature of the improved singularizing apparatus; it ensures that only one hook 4 is caused to advance over the section 7 of the stop 6 in response to each lifting of the elevator 10 to the position of FIGS. 3–4. The aforediscussed selection of the width X of the inlet of the channel 18 between the stop 6 and the guide 19 also contributes to reliability of the singularizing operation.

Mounting of the leg 11 in the tubular stop 6 exhibits the advantage that the top land 12 is immediately or very closely adjacent the flank 8 so that the width of the clearance (if any) between the flank 9 and the top land 12 in the upper position of the elevator 2 is negligible. The feature that at least a portion of the top land 12 is flush (i.e., at least substantially coplanar) with the flank 9 in the upper position of the elevator 10 also contributes to reliable and rapid advancement of a lifted hook 4 over the section 7 of the stop 6 and onto the ramp 2 below the opening 5.

The improved apparatus is susceptible of many modifications without departing from the spirit of the invention. For example, the tubular ramp 2 can be replaced with a solid ramp and the ramp need not have a circular external surface, as long as the hooks 4 are free to slide therealong toward and, when necessary, beyond the section 7 of the stop 6.

It is also possible to omit the tubular lower section of the stop 6, i.e., the entire stop can consist of the section 7 which is welded, otherwise bonded or separably secured to a selected intermediate portion of the ramp 2. Thus, the leg 11 of the elevator 10 need not be guided by the stop 6; all that counts is to ensure that the top land 12 of the leg 11 is adjacent and is located upstream of the flank 8 so that it can lift the foremost hook 4 above the apex of the section 7. The cross-sectional shape of the leg 11 can also depart from the illustrated (circular) outline. For example, it is possible to employ a leg 11 which has a polygonal (such as square or rectangular) cross-sectional outline. Still further, the stroke of the piston rod 15 can be selected in such a way that the entire top land 12 is located at a level at least slightly above the apex of the tooth-shaped section 7 of the stop 6 when the leg 11 is moved to the upper position.

It is also possible to fixedly mount the piston rod 15 on the support 1 and to operate the motor 13 in such a way that the cylinder 14 is movable up and down and is separably, adjustably or otherwise coupled to the leg 16 of the elevator 10. All of the above-enumerated modifications will be readily comprehended by those having the required skill in the art without additional illustrations.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for singularizing objects, particularly garment hangers, having substantially hook-shaped suspendible portions of substantially circular cross-sectional outline with a predetermined diameter, comprising a ramp including an upper portion and a lower portion, said ramp being arranged to support a series of suspendible portions and having an inclination such that the suspendible portions thereon slide by gravity in a direction from said upper to said lower portion; an intercepting member disposed intermediate said upper and lower portions and having a section located in the path of movement of oncoming suspendible portions on said ramp so that the foremost oncoming suspendible portion comes to rest in response to engagement with said intercepting member; means for lifting successive suspendible portions of the series of suspendible portions above said member, including an elevator adjacent and located aheat of said section in said direction, and means for moving said elevator between a lower position beneath the suspendible portion which abuts said intercepting member and an upper position in which the elevator lifts the suspendible portion thereabove to a level such that the thus lifted suspendible portion can ride over and beyond said intercepting member in said direction; and a guide disposed above and defining with said intercepting member a channel for suspendible portions of successive objects, said guide extending from upstream to downstream of said intercepting member and said elevator, said channel having an inlet which is adjacent said elevator in the upper position of said elevator, said inlet having a width in said direction which is between about 1 and 2 D wherein D is said predetermined diameter, said guide having a recess which forms part of the channel and said elevator extending into said recess in said upper position thereof.

2. The apparatus of claim 1, wherein said section of said intercepting member includes a tooth having an arresting flank facing counter and extending substantially at right angles to said direction, said elevator being arranged to lift the suspendible portion thereon above said flank in response to movement to said upper position.

3. The apparatus of claim 2, wherein said elevator has a top land which slopes downwardly in said direction and carries the suspendible portion thereabove during movement to said upper position so that the suspendible portion thereon can slide along and beyond the top land and beyond said intercepting member in the upper position of said elevator.

4. The apparatus of claim 3, wherein said tooth has a second flank defining with said arresting flank an apex which is located beneath said top land in the upper position of said elevator so that the suspendible portion on said top land can ride over said apex and said second flank in response to movement of said elevator to said upper position.

5. The apparatus of claim 4, wherein the effective width of said top land in said direction being between about 0.5 and 1.5 D.

6. The apparatus of claim 1, wherein said intercepting member includes a second section which is confined in said ramp.

7. The apparatus of claim 6, wherein said second section of said intercepting member is a tube.

8. The apparatus of claim 6, wherein said ramp includes a tube having a substantially cylindrical external surface.

9. The apparatus of claim 1, wherein said section has a flank which slopes toward said ramp in said direction, said elevator having a top land which is substantially flush with said flank in the upper position of said elevator.

10. The apparatus of claim 1, wherein said ramp includes a tube and said elevator includes a substantially vertical first leg which is reciprocably installed in said tube adjacent said intercepting member, and a second leg disposed beneath said tube and rigid with said first leg, said moving means including a fluid-operated motor having an output element connected with said second leg.

11. The apparatus of claim 10, wherein said motor is located at one side of and is spaced apart from said tube.

12. The apparatus of claim 11, wherein said motor includes a cylinder and piston unit having a mobile piston including said output element.

13. The apparatus of claim 1 for singularizing objects having arcuate suspendible portions with a predetermined radius of curvature, said ramp having a substantially cylindrical external surface with a radius between approximately 0.6 and 0.9 R wherein R is said radius of curvature.

14. The apparatus of claim 13, wherein the radius of said external surface is between approximately 0.65 and 0.7 R.

15. The apparatus of claim 1, further comprising means for supporting said ramp, said intercepting member and said lifting means, and means for adjustably mounting said guide on said support.

16. The apparatus of claim 1, wherein said intercepting member is hollow and said elevator has a portion which is movably installed in said intercepting member.

17. The apparatus of claim 1, wherein said elevator includes a portion which is adjacent said intercepting member and has a substantially circular cross-sectional outline.

18. The apparatus of claim 1, wherein said ramp has a first opening and a second opening, said elevator extending from said ramp through one of said openings in said lower position and elevator extending from said ramp through each of said openings in said upper position thereof.

* * * * *